(12) United States Patent
Tsuyuguchi et al.

(10) Patent No.: US 8,498,800 B2
(45) Date of Patent: Jul. 30, 2013

(54) ENGINE CONTROL UNIT

(75) Inventors: Makoto Tsuyuguchi, Saitama (JP); Akihiko Hamazaki, Saitama (JP); Toru Takeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 206 days.

(21) Appl. No.: 13/071,583

(22) Filed: Mar. 25, 2011

(65) Prior Publication Data
US 2011/0238261 A1    Sep. 29, 2011

(30) Foreign Application Priority Data
Mar. 29, 2010    (JP) ................. 2010-075089

(51) Int. Cl.
*G05D 1/00*    (2006.01)
(52) U.S. Cl.
USPC ............ 701/107; 123/396; 123/399; 123/344
(58) Field of Classification Search
None
See application file for complete search history.

(56) References Cited

U.S. PATENT DOCUMENTS

| | | | |
|---|---|---|---|
| 5,551,396 A * | 9/1996 | Suzuki et al. | 123/399 |
| 2002/0020391 A1* | 2/2002 | Satou et al. | 123/396 |
| 2004/0002808 A1* | 1/2004 | Hashimoto et al. | 701/107 |

FOREIGN PATENT DOCUMENTS
JP    5-79354 A    3/1993

* cited by examiner

*Primary Examiner* — Thomas Tarcza
*Assistant Examiner* — Garrett Evans
(74) *Attorney, Agent, or Firm* — Birch, Stewart, Kolasch & Birch, LLP

(57) ABSTRACT

An engine control unit includes an anomaly judging section for judging whether or not there is any anomaly in throttle sensors based on the output of the throttle sensors, a throttle motor driving section for controlling the driving of a throttle motor, and a fuel injection control section for controlling the amount of fuel injection at the time of starting an engine by using the fuel injection map for starting. The throttle motor driving section stops the driving of the throttle motor if the throttle sensors are judged to be anomalous, and the fuel injection control section switches the fuel injection map for starting in a normal state into the fuel injection map for starting in an anomalous state at the time of restarting the engine after stopping the engine in a state wherein the throttle sensors are judged to be anomalous.

15 Claims, 12 Drawing Sheets

ENGINE CONTROL UNIT

CROSS-REFERENCE TO RELATED APPLICATIONS

The present application claims priority under 35 USC 119 to Japanese Patent Application No. 2010-075089 filed on Mar. 29, 2010 the entire contents of which are hereby incorporated by reference.

BACKGROUND OF THE INVENTION

1. Field of the Invention

The present invention relates to an engine control unit to control the engine of a motorcycle having the drive wire system.

2. Description of Background Art

Several methods are known for controlling a throttle valve opening of an vehicle engine electrically by motors through the drive-by-wire system. One of such methods is disclosed in Japanese Patent Laid-Open No. Hei 5-79354. This disclosure is concerned with an electronic accelerator system or electronic throttle system which is provided with a mechanism wherein the throttle valve is mechanically moved a certain amount toward its open side as the accelerator pedal is pressed down. This mechanism is intended to prevent the throttle valve from being moved by the return spring to the closed position (which disables the operation of the engine) in case of a failure in the electronic system. Therefore, this mechanism permits a certain amount of intake air to flow into the engine, thereby to start the engine, even when an anomaly occurs in the electronic throttle system.

However, the mechanical structure disclosed in Japanese Patent Laid-Open No. Hei 5-79354, which is designed to keep the throttle valve slightly open in case of an anomaly, has the disadvantage of requiring a complex mechanism in and around the throttle body in spite of the electronic throttle system. Consequently, it is inevitably large in size, which prevents its adoption into a motorcycle which does not have sufficient space to accommodate additional parts.

Moreover, if the structure disclosed in Japanese Patent Laid-Open No. Hei 5-79354 is not adopted, the throttle valve is moved to the close position by the return spring in case of an anomaly. The result is that the engine which has stopped in the anomalous state does not suck in as much intake air as necessary for restarting the engine but sucks in overrich intake air, because the throttle valve remains closed. This makes the engine hard to restart and prevents reverse driving. The engine incapable of restarting is particularly undesirable for comparatively large motorcycles equipped with a reverse system which permits the motorcycle to move backward while the engine is running.

SUMMARY AND OBJECTS OF THE INVENTION

The present invention addresses the foregoing problem with conventional engines. It is an object of an embodiment of the present invention to provide an engine control unit which permits easy starting of the engine when the throttle valve is returned to the close position as the result of an anomaly.

To achieve the foregoing objects, according to an embodiment of the present invention, there is provided an engine control unit including a drive system (80) capable of driving a motorcycle backward while an engine (22) is running, a throttle valve (162) which is energized toward its closed position by a return spring, and a drive-by-wire system (150) which detects the amount of operation of an accelerator by accelerator opening sensors (152, 154) and drives the throttle valve (162) by a throttle motor (166) in response to the amount of operation, thereby controlling the opening of the throttle valve (162) and detecting the opening by throttle opening sensors (168, 170), wherein the engine control unit has an anomaly judging section (204) which judges whether or not there is an anomaly in the throttle valve opening sensors (168, 170) based on the output of the throttle valve opening sensors (168, 170), a throttle motor driving section (206) which controls the driving of the throttle motor (166), and a fuel injection control section (210) which controls the amount of fuel injection at the time of starting the engine (22) by using the fuel injection map for starting, the throttle motor driving section (206) suspends the driving of the throttle motor (166) if the throttle valve opening sensors (168, 170) are judged to be anomalous by the anomaly judging section (204). Thus, the throttle valve (162) is caused to be returned to the closed position by the return spring. The fuel injection control section (210) has the fuel injection map for starting when the throttle valve opening sensors (168, 170) are in a normal state and the fuel injection map for starting in an anomalous state in which the amount of injection is set to be smaller than that in the fuel injection map for starting in a normal state. In addition, the fuel injection control section (210) also switches the fuel injection map for starting in a normal state into the fuel injection map for starting in an anomalous state, at the time of restarting the engine (22) after the engine (22) stops in a state that the throttle valve opening sensors (168, 170) are judged to be anomalous by the anomaly judging section (204), thereby enabling the engine to start and allowing the motorcycle to be moved backward by the drive system (80).

According to an embodiment of the present invention, there is provided an engine control unit wherein the fuel injection control section (210) determines the amount of injection from the engine negative pressure and the number of engine revolutions after the engine (22) is started and also determines the amount of injection from the water temperature of the engine (22) at the time of starting the engine (22), and the fuel injection map for starting in an anomalous state is established such that the amount of injection decreases as the water temperature of the engine (22) rises.

According to an embodiment of the present invention, there is provided an engine control unit wherein the fuel injection control section (210) determines the basic amount of injection from the engine negative pressure and the number of engine revolutions after the engine (22) is started and also determines the amount of fuel injection after the engine (22) is started by performing temperature correction on the basic amount of injection in response to the water temperature of the engine (22) by using the temperature correction map. The fuel injection control section (210) further includes the temperature correction map when the throttle valve opening sensors (168, 170) are in a normal state and the temperature correction map in an anomalous state in which the amount of correction is set to be smaller than that of the temperature correction map in a normal state, and switches the temperature correction map applicable in a normal state into the temperature correction map applicable in an anomalous state when the engine (22) is restarted in a state that the anomaly judging section (204) judges to be anomalous.

According to an embodiment of the present invention, there is provided an engine control unit wherein the temperature correction map applicable in case of anomaly is set such that the amount of correction decreases as the water temperature of the engine (22) rises.

According to an embodiment of the present invention, there is provided an engine control unit wherein the anomaly judging section (204) judges whether or not the accelerator opening sensors (152, 154) are anomalous according to the output from the accelerator opening sensors (152, 154), and the throttle motor driving section (206) drives the throttle motor (166) to set the opening of the throttle valve (162) to the idle opening in the case where only the accelerator opening sensors (152, 154) are judged to be anomalous by the anomaly judging section (204).

According to an embodiment of the present invention, an engine control unit further includes an ignition timing control section (212) for controlling the ignition timing at the time of starting by using the ignition timing map for starting, wherein the ignition timing control section (212) has the ignition timing map for starting when the throttle valve opening sensors (168, 170) are normal and the ignition timing map for starting when the throttle valve opening sensors (168, 170) are anomalous, and switches the ignition timing map for starting in a normal state into the ignition timing map for starting in an anomalous state, thereby advancing the ignition timing, at the time of restarting the engine (22) after the engine (22) stops in a state that the anomaly judging section judges to be anomalous.

According to an embodiment of the present invention, in the case where the engine is restarted after it is stopped because the throttle valve opening sensors are judged to be anomalous, the fuel injection map for starting, which is used to control the amount of fuel injection, is switched from the fuel injection map for starting in a normal state into the fuel injection map for starting in an anomalous state in which the amount of injection is smaller than that in a normal state. As a result, the amount of fuel injection is reduced even in the case where the throttle valve is closed; this prevents the air-fuel ratio from becoming overrich and permits the engine to start easily. In addition, since it is unnecessary to mechanically move the throttle valve in the open direction in the case of an anomaly, size reduction around the throttle body is achieved. Moreover, this design permits the engine to start easily even in the case where the throttle valve becomes closed owing to an anomaly in the throttle valve opening sensors, and the rider can move the motorcycle backward by the reverse driving system. This improves convenience for the rider.

According to an embodiment of the present invention, the fuel injection map shows the relation between the water temperature and the amount of fuel injection is employed. Thus, it is possible to determine an adequate amount of fuel injection even in the case where the engine is started in a situation unfavorable for detection of an accurate negative pressure of the engine and the like. The fuel injection map for starting is established such that the amount of injection decreases as the water temperature of the engine rises. Therefore, in the case where the water temperature of the engine is low, the amount of fuel injection is increased so that the engine is started easily even in an anomalous state.

According to an embodiment of the present invention, the basic amount of injection is calculated from the negative pressure of the engine and the number of revolutions of the engine after restarting the engine, with the throttle valve opening sensor in an anomalous state. Simultaneously with this calculation, the throttle valve opening sensor switches the temperature correction map to be used to correct the basic amount of injection in response to the temperature from the temperature correction map in a normal state into the temperature correction map in an anomalous state. As a result, fuel injection is performed with a temperature correction corresponding to the closed state even in the case where the throttle valve is closed. This stabilizes the number of revolutions of the engine after the engine is started. This contributes to an easy starting of the engine.

According to an embodiment of the present invention, the temperature correction map is set such that the amount of correction decreases as the water temperature of the engine rises. The effect of this is that when the water temperature of the engine is low, the amount of injection can be increased. This permits the engine to start easily at the time of anomaly.

According to an embodiment of the present invention, the throttle valve is set to the idle opening when only the accelerator opening sensor is judged to be anomalous. This eliminates the necessity of switching the fuel injection map more often than necessary. Thus, this simplifies the control process.

According to an embodiment of the present invention, the ignition timing is advanced by switching to the ignition timing map for starting when the throttle valve opening sensor is anomalous in the case where the engine is restarted while the throttle valve opening sensor is anomalous. As a result, the number of revolutions of the engine can be increased rapidly, thereby permitting easy starting of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following is a detailed description of the engine control unit according to the present invention, which is elaborated with reference to the preferred embodiments and the accompanying drawings.

Figure 1:
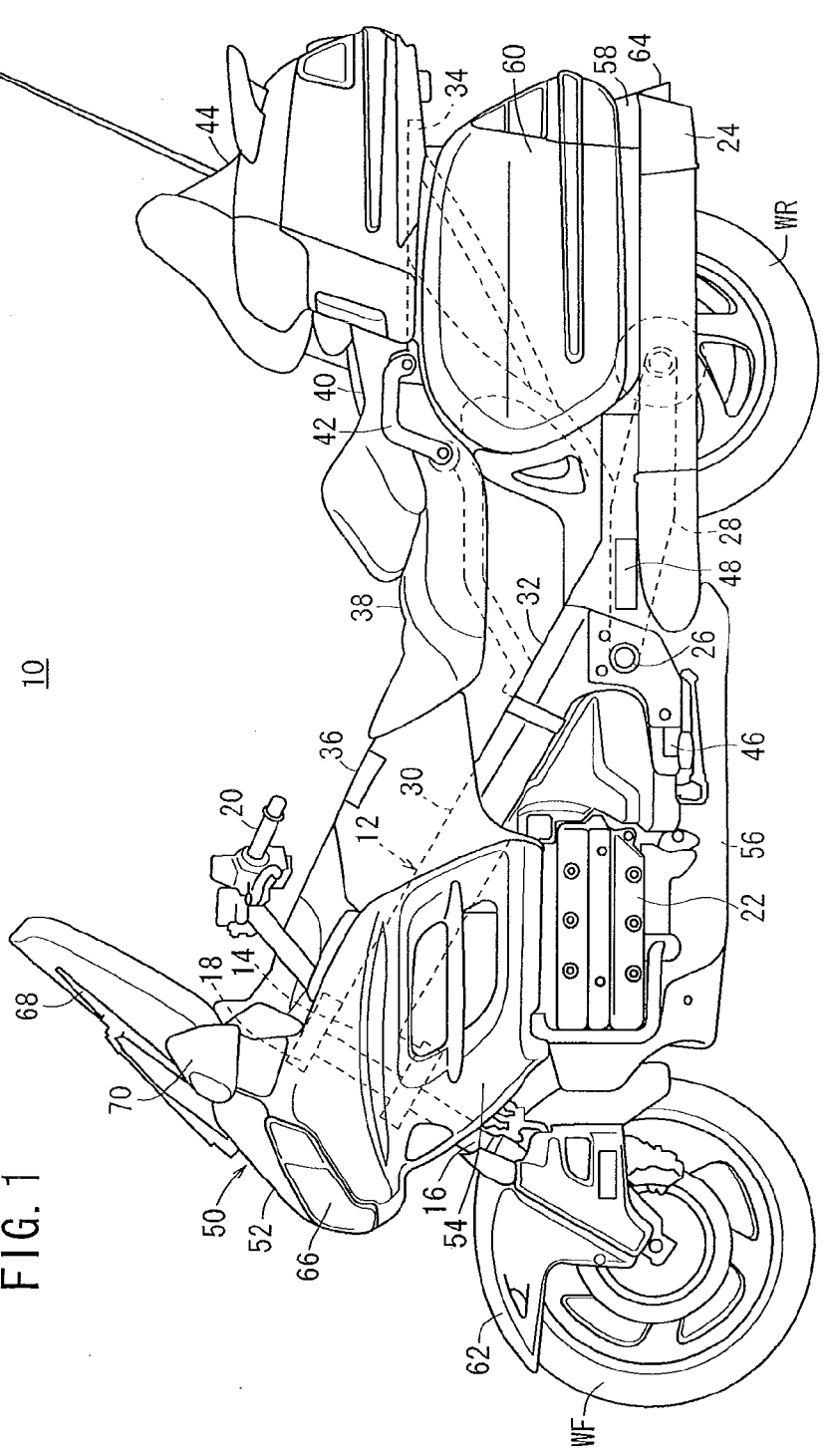
FIG. 1 is a side view showing the motorcycle equipped with the engine control unit according to the embodiment.
Figure 2:
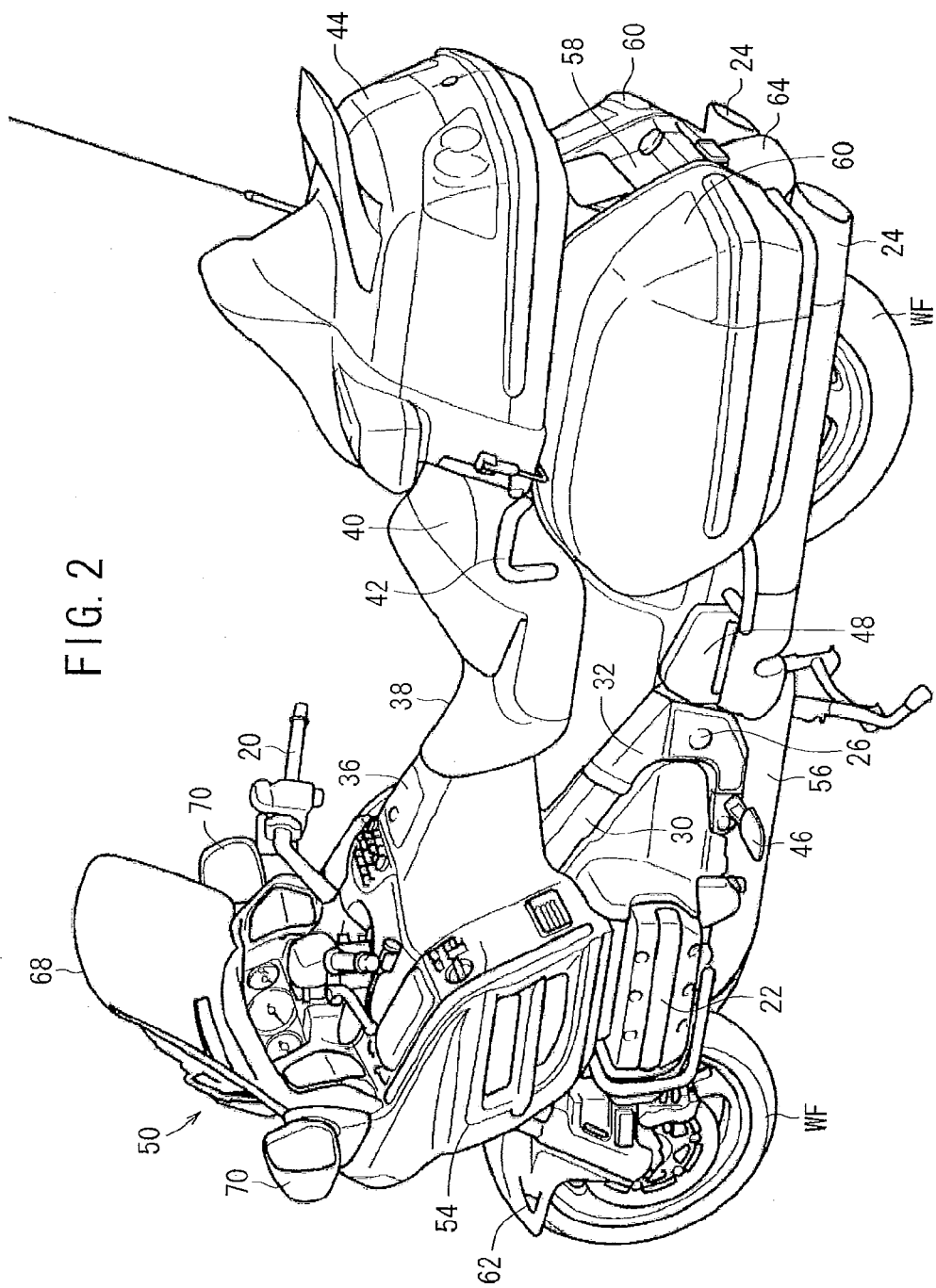
FIG. 2 is a rear perspective view showing the appearance of the motorcycle shown in FIG. 1.

FIG. 1 is a side view showing a motorcycle 10 equipped with the engine control unit. FIG. 2 is a rear perspective view showing the appearance of the motorcycle 10 shown in FIG. 1. The motorcycle 10 is equipped with a body frame 12, a head pipe 14 which is attached to the front end of the body frame 12, laterally paired front fork 16 which is rotatably supported by the head pipe 14, a steering handle 20 which is attached to a top bridge 18 supported at the upper end of a front fork 16, the front wheel WF which is attached to the front fork 16, an engine 22 supported on the body frame 12, an exhaust muffler 24 which is connected to the engine 22 through an exhaust pipe (not shown), a swing arm 28 which is swingably supported on a pivot shaft 26 at the rear lower part of the body frame 12, and a rear wheel WR attached to the rear end of the swing arm 28.

The body frame 12 has a laterally paired main frame 30 which branches rightward and leftward and extends backward and obliquely downward from the head pipe 14, a laterally paired pivot plate 32 which is connected to the rear part of the main frame 30, and a laterally paired seat frame 34 which extends backward and obliquely upward from the front and rear parts of the pivot plate 32. There is a fuel tank 36 which is placed over the main frame 30. A rider seat 38 and an occupant seat 40 are placed over the seat frame 34. The occupant seat 40 has a grab rail 42 and a trunk box 44 attached to the rear part thereof.

The pivot plate 32 of the body frame 12 has a laterally paired step 46 for the rider mounting on the rider seat 38 and also has a laterally paired step 48 for the occupant mounting on the occupant seat 40.

The body frame 12 has a body cowling 50 attached thereto. The body cowling 50 has a front cover 52 which covers the front part of the body, a laterally paired side cover 54 which covers the lateral parts of the body, an undercover 56 which covers the lower part of the body, and a rear seal cowl 58 which covers the rear part of the body. The rear seat cowl 58 has a laterally paired saddleback 60 integrally formed thereon. A front fender 62 which covers the front wheel WF is attached to the front fork 16, and a rear fender 64 which covers the rear wheel WR is attached to the rear seat cowl 58. The front cover 52 has a head light 66 attached to the front side thereof, has a windshield 68 attached to the upper part thereof, and has a side mirrors 70 attached to the right and left ends thereof.

Figure 3:
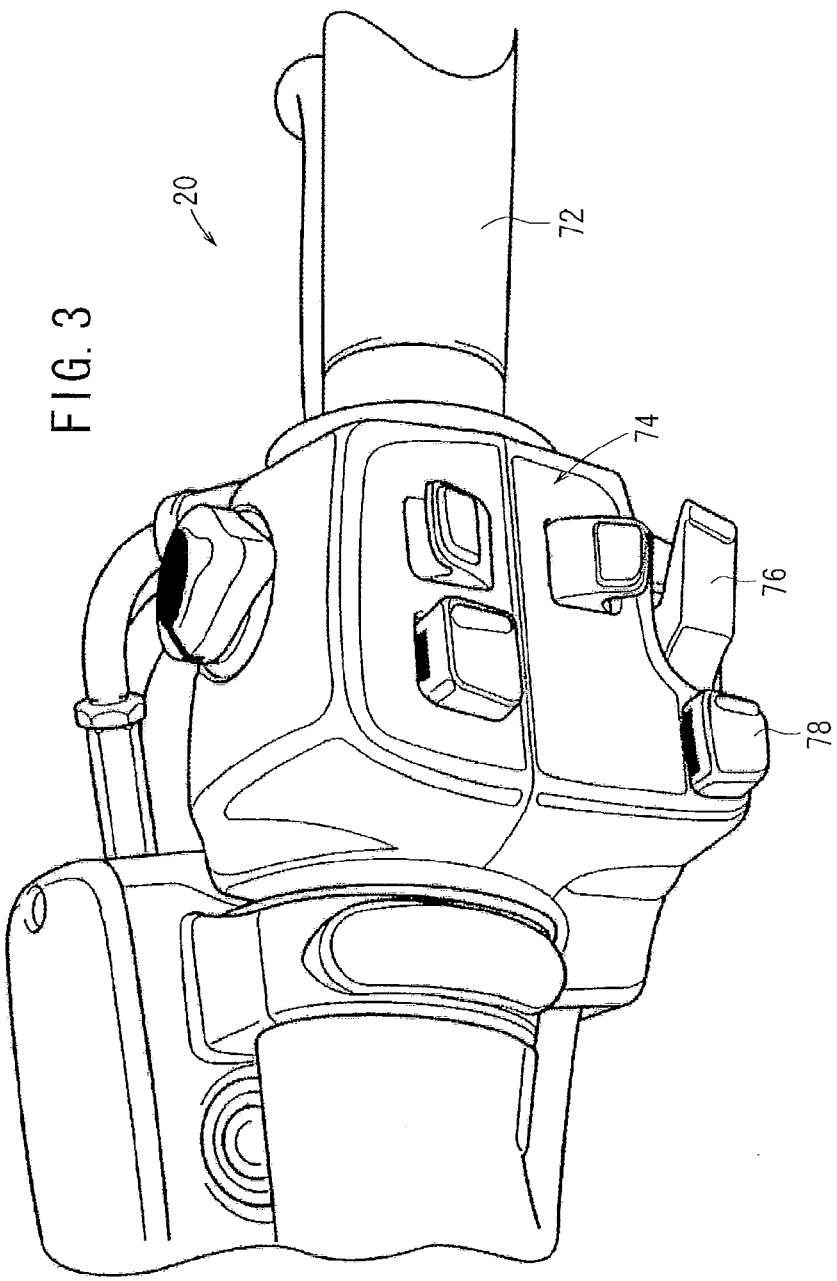
FIG. 3 is a partly enlarged view showing the right steering handle shown in FIG. 2.

FIG. 3 is a partly enlarged view showing the right steering handle 20 shown in FIG. 2. The right steering handle 20 has an accelerator grip 72 and a switch box 74. The switch box 74 is provided with a starter/reverse switch 76 to start engine and a reverse shifter switch 78 to shift a starter motor between starting and reversing.

Figure 4:
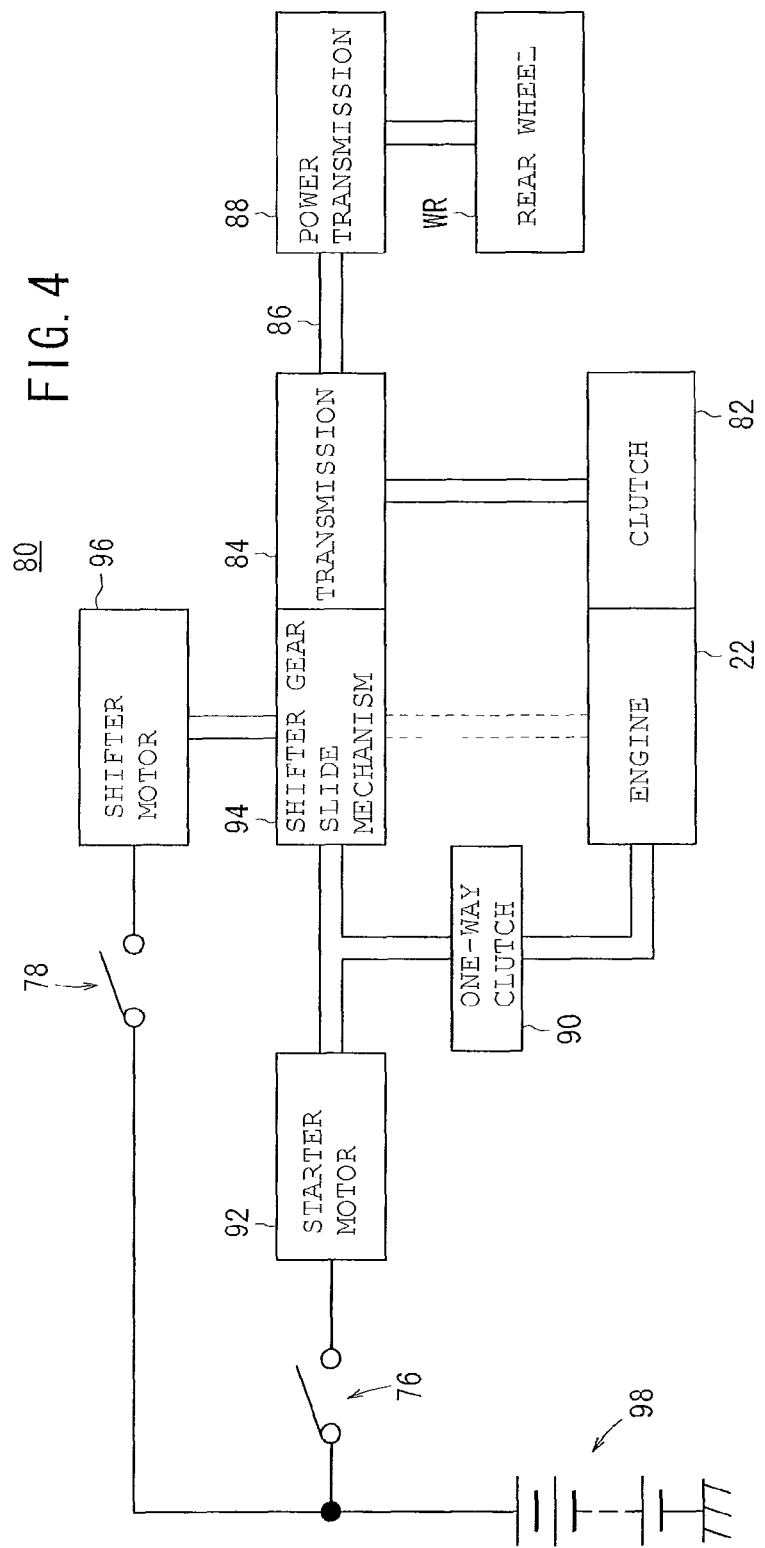
FIG. 4 is a block diagram showing the drive system having the reverse function for the engine control unit.

FIG. 4 is a block diagram showing a drive system 80 having a reverse function for the engine control unit. The engine 22 is connected to a clutch 82 and then a transmission 84 of a multistage gear type, which has its final stage shaft 86 connected to a power transmission gear 88 (consisting of sprocket and chain) and then the rear wheel WR. While the engine 22 is running and the clutch 82 is connected, the rear wheel rotates in the direction in response to the shift position and also in response to the reduction ratio of the gear of the transmission 84.

The engine 22 has the crankshaft (not shown) which is connected to a starter motor 92, with a one-way clutch 90 interposed between them. The starter motor 92 is coupled to a shifter gear slide mechanism 94 and then to the final stage shaft 86 of the transmission 84. The one-way clutch 90 is intended to transmit starting power from the starter motor 92 to the engine 22 in one way.

The shifter gear slide mechanism 94 is intended to switch the connection of the starter motor 92 to the final stage shaft 86 of the transmission 84. It is coupled to a shifter motor 96 that functions as an actuator to control it. The starter motor 92 is electrically connected to a battery 98 through the starter/reverse switch 76 to start the starter motor 92. The shifter motor 96 is electrically connected to the battery 98 through the reverse shifter switch 78 which switches the starter motor 92 between for starting and for reversing. In this example, the starter motor 92 is used to supply the driving power for reversing, and this permits the motorcycle to be reversed much slower than in the case where the engine 22 is used for reversing.

Figure 5:
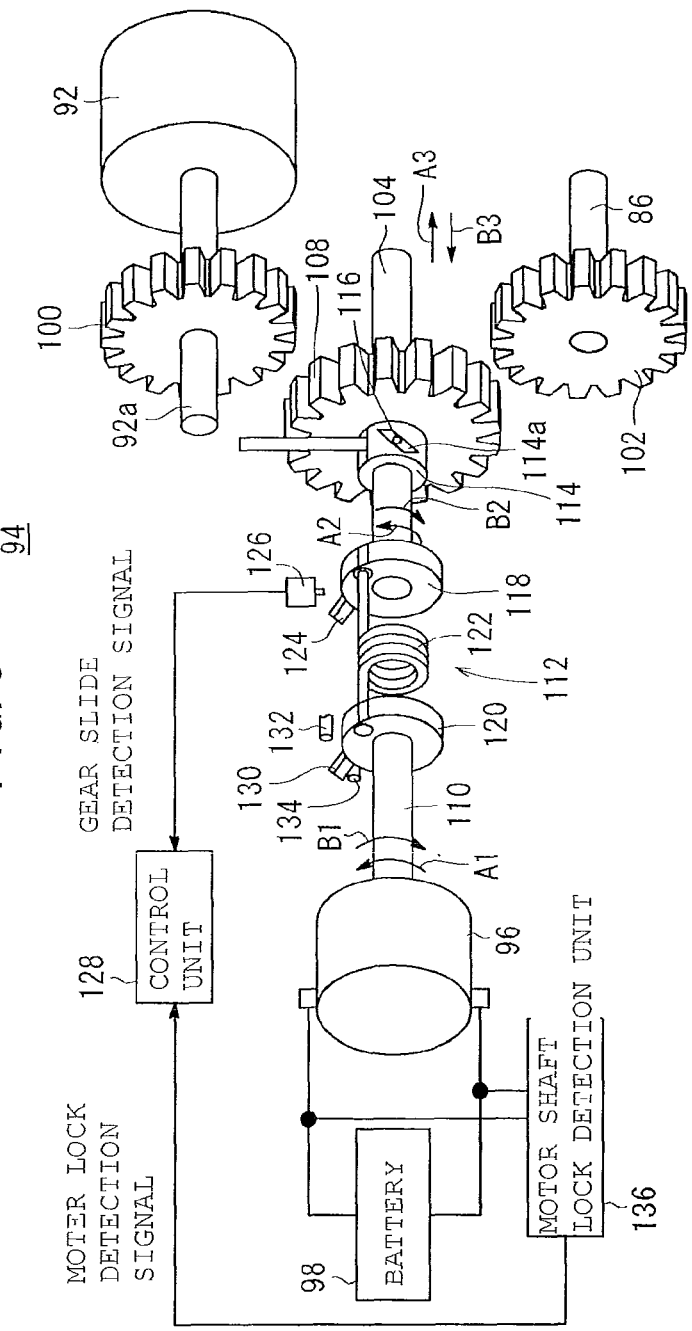
FIG. 5 is a diagram showing the structure of the shifter gear slide mechanism shown in FIG. 4.

FIG. 5 is a diagram showing the mechanism of the shifter gear slide mechanism 94. The shifter gear slide mechanism 94 has a shifter gear 108 attached to a reverse shaft 104, which transmits the rotation of a reverse drive gear 100 being turned by the starter motor 92 (to start the engine 22) to a reverse gear 102 (to reverse the motorcycle). The reverse gear 102 is a driven gear fixed to the final stage shaft 86 of the transmission 84.

The shift motor 96 rotates the revolving shaft 110 in the normal or reverse direction, and the revolving shaft 110 is arranged coaxially with the reverse shaft 104. The shifter gear slide mechanism 94 has the reverse shaft 104 and the lost motion mechanism 112 which couples the revolving shaft 110 to the reverse shaft 104. In addition, the starter motor 92 is a motor that rotates only in one way, and it works to start the engine 22 and also move the motorcycle backward.

The shifter gear 108 is mounted in such a way that it turns in the circumferential direction of the reverse shaft 104 and it also slides on the reverse shaft 104 in its axial direction. The shifter gear 108 meshes with the reverse drive gear 100 and the reverse gear 102.

The shifter gear slide mechanism 94 is so designed as to slide the shifter gear 108 in the axial direction on the reverse shaft 104 (whose axial direction is fixed) as the shifter motor 96 turns. The reverse shaft 104 has a cam 114 attached to one end thereof. The cam 114, which is swingable only in the axial direction, is provided with an arcuate cam hole 114a, which is inclined right up with respect to the circumference of the cam surface. The cam hole 114a has a pin 116 loosely fitted thereto. The pin 116 projects from and fixes on the reverse shaft 104. The shift motor 96 is mounted such that its revolving shaft 110 is parallel to a revolving shaft 92a of the starter motor 92 and the final stage shaft 86 of the transmission 84.

The lost motion mechanism 112 is arranged coaxially with a plate 118 (which is fixed to the end of the reverse shaft 104) and the reverse shaft 104. It has a discoid plate 120 (which is fixed to the end of the revolting shaft 110 of the shifter motor 96) and a coil spring 122 (which is fixed by its ends between the plate 118 and the plate 120). The reverse shaft 104, the revolving shaft 110 of the shift motor 96, and the coil spring 122 are coaxially arranged. When the revolving shaft 110 of the shifter motor 96 and the plate 120 rotate in one direction, the lost motion mechanism 112 turns the plate 118 in the same direction as their rotation. If the plate 118 does not rotate due to resistance whatsoever, the energy for rotation is stored in the coil spring 122.

For example, if the revolving shaft 110 of the shift motor 96 and the plate 120 turn in the counterclockwise direction, the cam 114 and the pin 116 move (rightward in FIG. 5) in such a way that the shifter gear 108 meshes with the reverse drive gear 110 and the reverse gear 102. However, there may be an instance in which the rightward movement does not occur smoothly depending on the position of the shifter gear 108 relative to the reverse drive gear 100 or the reverse gear 102 (because the gear faces are in contact with each other). In this instance, the coil spring 122 energizes the plate 118 in the counterclockwise direction as soon as the cause that prevents the smooth movement disappears, so that the cam 114 and the shifter gear 108 move rightward, thereby allowing the gears to mesh with each other.

In addition, a plate 118 has the projection 124 formed on the periphery thereof. This projection 124 has its position detected by the position sensor 126. When the plate 118 turns to a predetermined position, a position sensor 126 detects the projection 124 and sends the gear slide detection signal to a control unit 128. In this way, the slide movement of the cam 114 along the reverse shaft 104 permits the control unit 128 to detects that the shifter gear 108 has moved to the reverse position (to mesh with the reverse gear 102). When the control unit 128 detects that the shifter gear 108 has moved to the reverse position, it turns on an LED arranged in the display unit (not shown) which tells the rider the speed and the engine revolution. Thus the rider is informed that the motorcycle is ready for backward movement. In addition, the control unit 128 also controls the starter motor 92 and the shift motor 96.

The plate 120 has a projection 130 formed on the periphery thereof. Adjacent to the projection 130 are pins 132 and 134, which regulate the rotation of the plate 120 which results from the rotation of the revolving shaft 110 of the shifter motor 96.

The shifter motor 96 is connected to a motor shaft lock detection unit 136 which detects driving current at all times and also detects the lock current that arises when the rotation of the plate 120 is restricted and sends the motor lock detection signal to the control unit 128. As soon as the control unit 128 receives the gear slide detection signal from the position sensor 126 or the motor lock detection signal from the motor shaft lock detection unit 136, it works to stop the shifter motor 96 or rotate the shifter motor 96 in the normal or reverse direction.

The following is a description of the action of the shifter gear slide mechanism 94. When the shifter motor 96 becomes activated, the revolving shaft 110 of the shifter motor 110 rotates in the direction of arrow A1 or B1. The rotation of the revolving shaft 110 and the plate 120 is transmitted to the plate 118 through the coil spring 122 of the lost motion mechanism 112, so that the reverse shaft 104 rotates in the direction of arrow A2 or B2. As the reverse shaft 104 rotates, the cam 114 moves (relative to the reverse shaft 104) linearly in the direction of arrow A3 or B3, thereby sliding the shifter gear 108.

FIG. 5 illustrates in a way that the shifter gear 108 is being moved to the reverse position for the backward movement of the motorcycle. To be more specific, it shows immediately before the revolving shaft 110 of the shifter motor 96 turns in the direction of arrow A1 and the cam 114 displaces in the direction of arrow A3 relative to the reverse shaft 104, so that the shifter gear 108 meshes with the reverse gear 102 of the transmission 84.

After that, the shifter gear 108 moves further to the reverse position so as to mesh with the reverse gear 102 of the transmission 84 and the reverse drive gear 100. While the shifter gear 108 is at the reverse position, the starter/reverse switch 76 may be pressed so as to start the starter motor 92. The rotation of the starter motor 92 is transmitted to the reverse gear 102 through the reverse drive gear 100 and the shifter gear 108. This action causes the motorcycle to move backward.

On the other hand, the starter motor 92 can be disengaged from the reverse gear or moved to the neutral position in the following manner. The revolving shaft 110 of the shifter motor 96 is turned in the direction of arrow B1 so that the cam 114 displaces in the direction of arrow B3 and the shifter gear 108 is disengaged from the reverse drive gear 100 and the reverse gear 102.

The following is a description of the procedure for moving the motorcycle 10 backward. In addition, it is assumed that the shifter gear 108 is at the neutral position in the initial state. After having started the engine 22, the rider presses the starter/reverse switch 76, thereby causing the starter motor 92 to rotate and the engine 22 to start. The engine 22 generates electric power to be stored in the battery 98. The reason why the rider starts the engine 22 before moving the motorcycle 10 backward is that the rotation of the starter motor 92 might reduce the amount of electric power remaining in the battery 98, or make the battery 98 dead in the worst case. Reversing the large-sized motorcycle 10 by means of the starter motor 92 would rapidly consume the electric power of the battery 98.

After the engine 22 is started, the rider presses the reverse shift switch 78 so as to start the shifter motor 96. The shifter motor 96 in action causes the shifter gear 108 to move in the direction of arrow A3, so that the shifter gear 108 meshes with the reverse drive gear 100 and the reverse gear 102.

Then, the rider presses the starter/reverse switch 76 so as to start the starter motor 92. The rotation of the starter motor 92 is transmitted to the reverse gear 102 so that the motorcycle 10 moves backward. While the starter/reverse switch 76 is being pressed, the motorcycle 10 continues to move backward. When the starter/reverse switch 76 is released, the motorcycle 10 stops. Then, the rider presses the starter/reverse switch 76 again so as to drive the shifter motor 96. The rotation of the shifter motor 96 causes the shifter gear 108 to disengage from the reverse drive gear 100 and the reverse gear 102 and to return the shifter gear 108 to its neutral position.

In addition, in the example mentioned above, the starter motor 92 coupled to the revolving shaft 92a is used as the power source for the reverse mechanism. However, this example may be modified such that the reverse drive gear 100 is coupled to the revolving shaft 92a which is turned by the output of the engine 22, so that the driving force of the engine 22 is supplied to the reverse drive gear 100. In this case, the engine 22 is coupled to the transmission 84 through the shifter gear slide mechanism 94 as shown in FIG. 4. Thus, the driving force of the engine 22 is transmitted to the rear wheel WR through the final stage shaft 86 of the transmission 84 and the power transmitting unit 88, so that the rear wheel WR is driven for backward movement.

Figure 6:
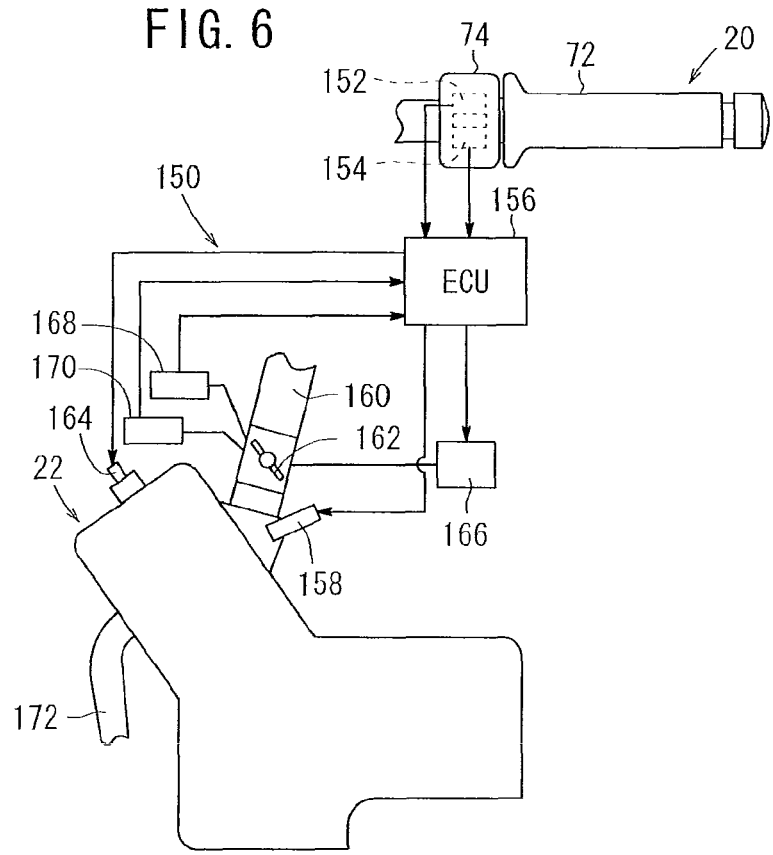
FIG. 6 is a diagram showing the construction of the drive-by-wire system for the engine control unit.

FIG. 6 is a diagram showing the construction of a drive-by-wire system 150 for the engine control unit. The switch box 74 on the right steering handle 20 contains a first accelerator opening sensor 152 and a second accelerator opening sensor 154, which detect the opening of the accelerator grip 72 (or how much the accelerator is turned by the rider). The values of opening detected by the first accelerator opening sensor 152 and the second accelerator opening sensor 154 are sent to a control unit (ECU) 156. If the first and second accelerator opening sensors 152 and 154 are normal, the values of opening detected by them are approximately identical. In addition, the foregoing description is based on an assumption that the first and second accelerator opening sensors 152 and 154 are placed in the switch box 74; however, they may be placed at any other places (such as the body frame).

An injector 158 injects fuel into the air, which is sucked through a throttle valve 162 attached to an intake pipe 160, thereby forming the air-fuel mixture. The throttle valve 162 adjusts the amount of air to be introduced into the combustion chamber (not shown) of the engine 22. In addition, the throttle valve 162 has the return spring (not shown) to return it to its closed position. This return spring energizes the throttle valve 162 toward the closed position. The mixture formed by the injector 158 flows into the combustion chamber (not shown) of the engine 22 and is ignited by an ignition plug 164, thereby exploding. The energy of explosion is converted into the driving force by the engine 22.

A throttle motor 166 adjusts the opening of the throttle valve 162 in response to control by the control unit 156. A first throttle valve opening sensor 168 and a second throttle valve opening sensor 170 detect the angle of rotation of the throttle valve 162, thereby detecting the opening of the throttle valve 162. The value of opening detected by the first throttle valve opening sensor 168 and the second throttle valve opening sensor 170 are sent to the control unit 156. If the first and second throttle valve opening sensors 168 and 170 are normal, the detected values of opening are approximately identical. The engine 22 is provided with an exhaust pipe 172 through which exhaust gas (arising from combustion of the mixture) is discharged.

So long as the first and second accelerator opening sensors 152 and 154 and the first and second throttle valve opening sensors 168 and 170 are normal, the control unit 156 drives the throttle motor 166, thereby adjusting the opening of the throttle valve 162, based on the opening value detected by at least either of the first accelerator opening sensor 152 or the second accelerator opening sensor 154. The embodiment mentioned herein is assumed (for the sake of easy understanding) that the throttle valve 162 is controlled so that the throttle valve 162 opens large in proportion to the opening of the accelerator grip 72 detected by the first and second accelerator opening sensors 152 and 154, and the larger the opening of the throttle valve 162, the larger the output of the engine 22.

The first accelerator opening sensor 152 and the second accelerator opening sensor 154 (which will be collectively referred to as the accelerator sensors) are regarded as anomalous if there is a difference larger than a predetermined absolute value between the value of opening detected by the first accelerator opening sensor 152 and the value of opening detected by the second accelerator opening sensor 154, there exists a short circuit between the first accelerator opening sensor 152 and the second accelerator opening sensor 154, or there is no change for a fixed period of time in the value of opening detected by the first accelerator opening sensor 152 and/or the value of opening detected by the second accelerator opening sensor 154. In such cases, it is considered that at least either of the first accelerator opening sensor 152 or the second accelerator opening sensor 154 is defective.

The first throttle valve opening sensor 168 and the second throttle valve opening sensor 170 (which will be collectively referred to as the throttle sensors) are regarded as anomalous if there is a difference larger than a predetermined absolute value between the value of opening detected by the first throttle valve opening sensor 168 and the value of opening detected by the second throttle valve opening sensor 170, there exists a short circuit between the first throttle valve opening sensor 168 and the second throttle valve opening sensor 170, or there is a blank longer than a fixed period of time in which the value of opening detected by the first throttle valve opening sensor 168 and/or the value of opening detected by the second throttle valve opening sensor 170 do not follow the target value. In such cases, it is considered that at least either of the first throttle valve opening sensor 168 or the second throttle valve opening sensor 170 is defective.

Figure 7:
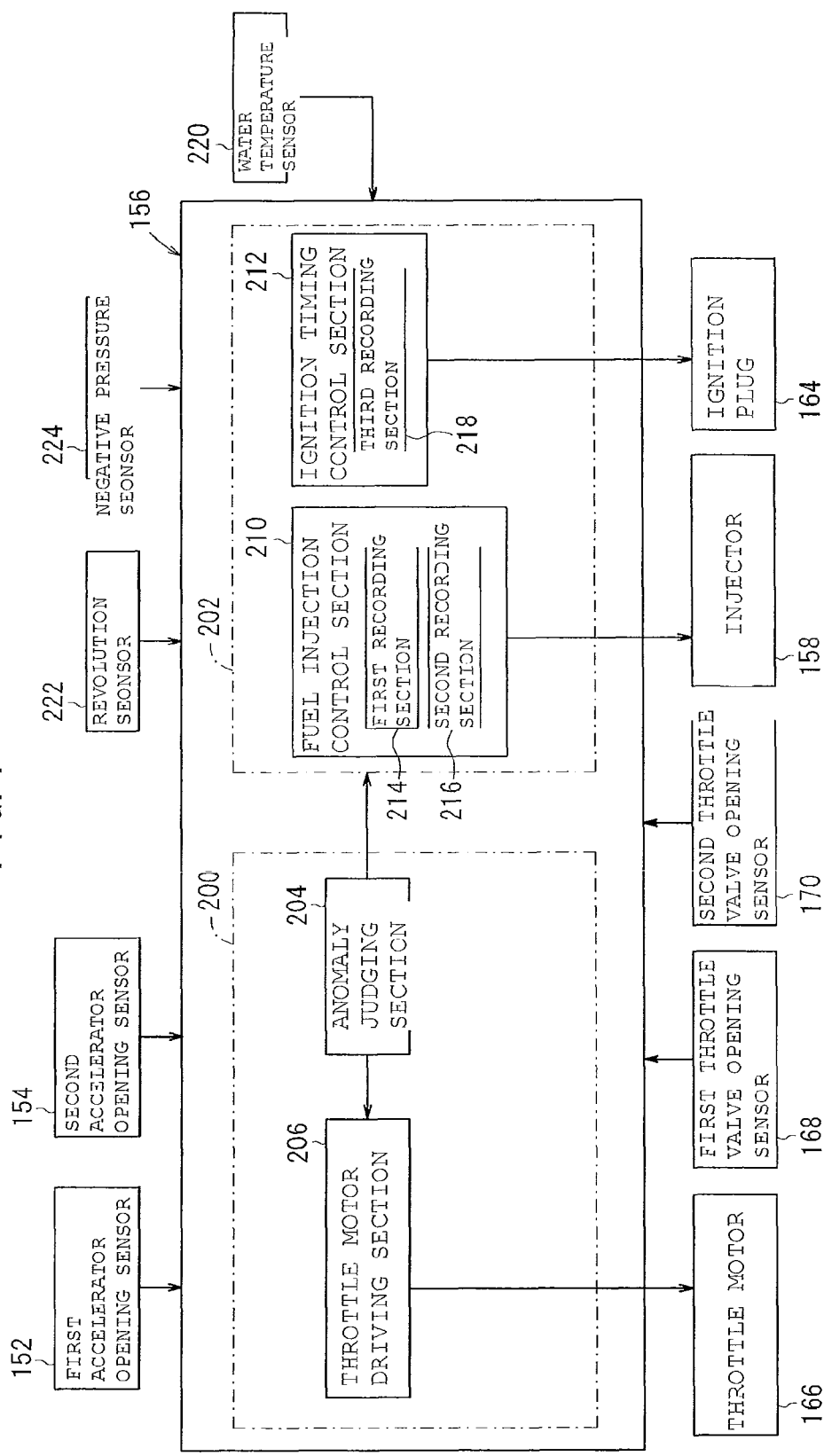
FIG. 7 is a functional block diagram for the control unit shown in FIG. 6.

FIG. 7 is a functional block diagram for the control unit 156. The control unit 156 has a throttle valve control section 200 and an engine control section 202. The throttle valve control section 200 has an anomaly judging section 204 and a throttle motor driving section 206. The engine control section 202 has a fuel injection control section 210 and an ignition timing control section 212. The fuel injection control section 210 has a first recording section 214 (which records the fuel injection map at the time of starting) and a second recording section 216 (which records the temperature correction map). The ignition timing control section 212 has a third recording section 218 (which records the ignition timing map at the time of starting).

The first recording section 214 records the fuel injection map for starting which is used when the throttle sensors are normal and also records the fuel injection map for starting which is used when the throttle sensors are anomalous. The second recording section 216 records the temperature correction map which is used when the throttle sensors are normal and also records the temperature correction map which is used when the throttle sensors are anomalous. The third recording section 218 records the ignition timing map for starting which is used when the throttle sensors are normal and also records the ignition timing map for starting which is used when the throttle sensors are anomalous.

The anomaly judging section 204 judges whether or not the accelerator sensors are anomalous from the values of opening detected by the first accelerator opening sensor 152 and the second accelerator opening sensor 154. The anomaly judging section 204 also judges whether or not the throttle sensors are anomalous from the values of opening detected by the first throttle valve opening sensor 168 and the second throttle valve opening sensor 170.

The throttle motor driving section 206 sets up the target opening of the throttle valve 162 according to the result of judgment by the anomaly judging section 204. The throttle motor driving section 206 also sets, according to need, the target opening value according to the value of opening detected by the first and second accelerator opening sensors 152 and 154. The throttle motor driving section 206 drives the throttle motor 166 according to the value of opening set above.

The fuel injection control section 210 controls the amount of fuel to be injected by the injector 158 according to the result of judgment by the anomaly judging section 204. The ignition timing control section 212 controls the timing for ignition by the ignition plug 164 according to the result of judgment by the anomaly judging section 204.

Figure 8:
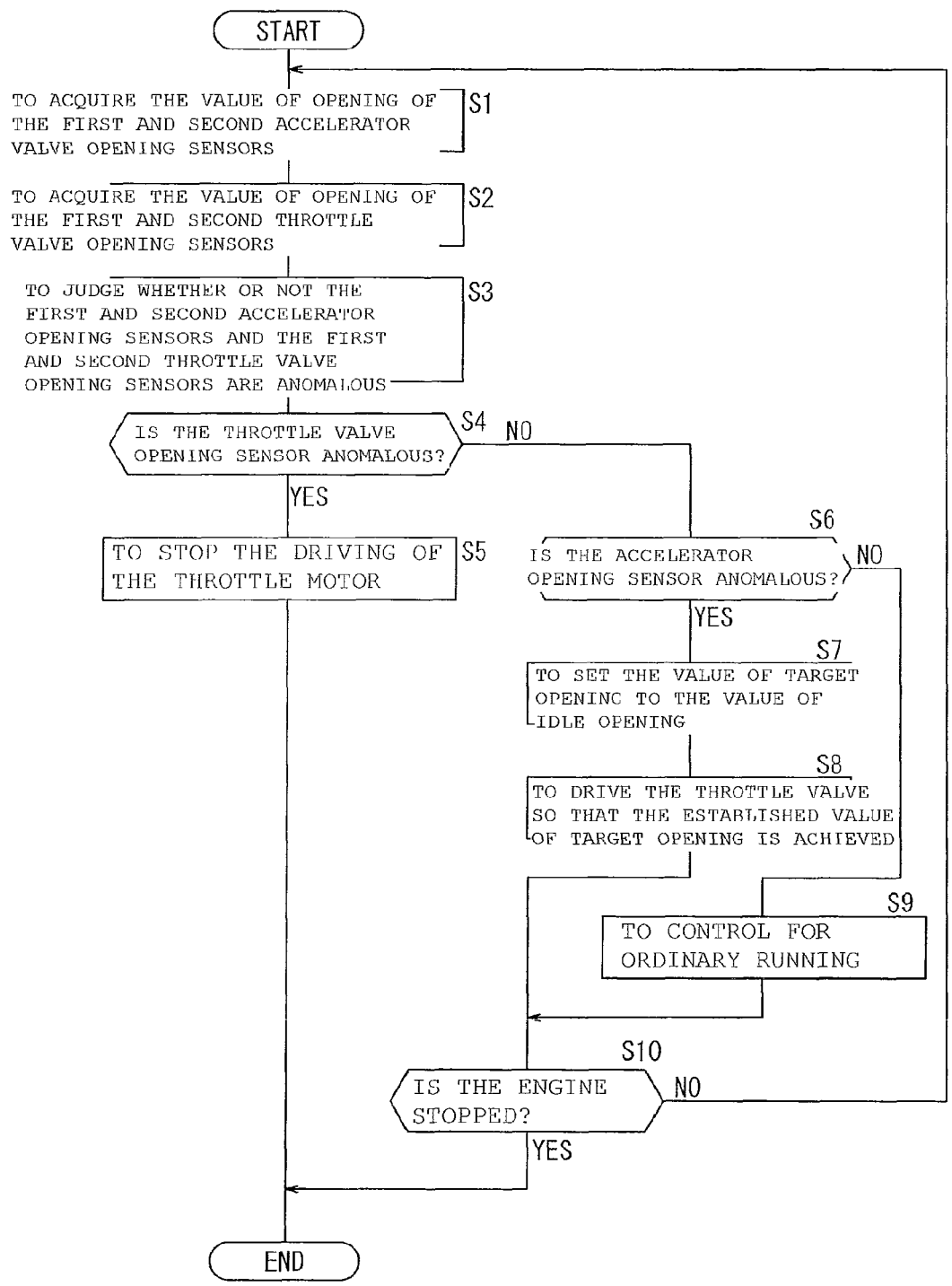
FIG. 8 is a flowchart showing the control action of the throttle control section shown in FIG. 6, said control action taking place while the engine is running.

FIG. 8 is a flowchart showing the control action for the throttle valve 162 which takes place while the engine 22 is running. First, the control unit 156 acquires the value of opening of the accelerator grip 72 detected by the first and second accelerator opening sensors 152 and 154 and also acquires the value of opening of the throttle valve 162 detected by the first and second throttle valve opening sensors 168 and 170 (Step S1 and Step S2).

Then, the anomaly judging section 204 judges whether or not there is anomaly in the first and second accelerator opening sensors 152 and 154 and the first and second throttle valve opening sensors 168 and 170 (Step 3). To be more specific, the anomaly judging section 204 judges that the accelerator sensors are anomalous in the case where there is a difference larger than a predetermined absolute value between the value of opening detected by the first accelerator opening sensor 152 and the value of opening detected by the second accelerator opening sensor 154, there exists a short circuit between the first accelerator opening sensor 152 and the second accelerator opening sensor 154, and there is a blank longer than a fixed period of time in which the value of opening detected by the first accelerator opening sensor 152 and/or the value of opening detected by the second accelerator opening sensor 154 remain unchanged.

Also, the anomaly judging section 204 judges that the throttle sensors are anomalous in the case where there is a difference larger than a predetermined absolute value between the value of opening detected by the first throttle valve opening sensor 168 and the value of opening detected by the second throttle valve opening sensor 170, there exists a short circuit between the first throttle valve opening sensor 168 and the second throttle valve opening sensor 170, and there is a blank longer than a fixed period of time in which the value of opening detected by the first throttle valve opening sensor 168 and/or the value of opening detected by the second throttle valve opening sensor 170 remain unchanged.

Then, the throttle motor driving section 206 judges whether or not the throttle sensors are judged to be anomalous in Step S3 (Step S4). If the throttle sensors are judged to be anomalous in Step S4, the throttle motor driving section 206 stops the driving of the throttle motor 166 (Step S5). Thus, the throttle valve 162 is returned to its closed position by the spring mentioned above (returned to a closed state).

It should be noted that the "closed position" does not necessarily mean that the throttle valve 162 completely prevents air from flowing from the intake valve 160 into the combustion chamber of the engine 22. In other words, even though the throttle valve 162 becomes closed, a very small amount of air enters the combustion chamber of the engine 22 from the intake pipe 160 through the throttle valve 162. As the throttle valve 162 becomes closed, the amount of air entering the combustion chamber of the engine 22 decreases, resulting in a low air/fuel ratio in the combustion chamber and hence resulting in an overrich mixture. This situation tends to bring about engine stall. The flowchart shown in FIG. 8 is based on an assumption that when the throttle motor 166 stops, the mixture becomes overrich, with engine stall occurring.

On the other hand, if the throttle sensors are judged to be normal in Step S4, the throttle motor driving section 206 judges whether or not the accelerator sensors are judged to be anomalous in Step 3 (Step S6). If the accelerator sensors are judged to be anomalous in Step S6, the throttle motor driving section 206 sets the target value of opening for the throttle valve 162 at the value of idle opening (Step 7). The value of idle opening denotes a situation in which the throttle valve 162 is open more than the closed state. It is the value of opening that permits the engine 22 to run at the minimum speed of revolution. The minimum speed of revolution is a speed of revolution at which the engine 22 does not stall or is a predetermined established speed of revolution).

Then, the throttle motor driving section 206 controls the throttle motor 166 such that the predetermined target value of opening is attained and drives the throttle valve 162 (Step S8), which is followed by Step S10. At this time, the throttle motor driving section 206 controls the throttle motor 166 such that the value of opening of the throttle valve 162 becomes equal to the target value of opening while watching the value of opening of the throttle valve 162 detected by the first and second throttle valve opening sensors 168 and 170.

On the other hand, if it is judged that there is not anomaly in the first and second accelerator opening sensors 152 and 154, the throttle motor driving section 206 carries out ordinary running control (Step S9), which is followed by Step S10. The ordinary running control means that the throttle motor driving section 206 sets the target value of opening for the throttle valve 162 which corresponds to the value of opening of the accelerator grip 72 detected by the first and second accelerator opening sensors 152 and 154. Then, the throttle motor driving section 206 controls the throttle motor 166 such that the value of opening of the throttle valve 162 becomes the predetermined value of opening. At this time, the throttle motor driving section 206 controls the throttle motor 166 while watching the value of opening of the throttle valve 162 detected by the first and second throttle valve opening sensors 168 and 170.

In Step S10, the control unit 156 judges whether or not the engine 22 is stopped. The engine 22 is stopped as the rider turns off the ignition key not shown, or the engine 22 may be stopped due to engine stall. If the result of judgment in Step S10 is that the engine is not at a stop, then Step S10 returns to Step S1.

Figure 9:
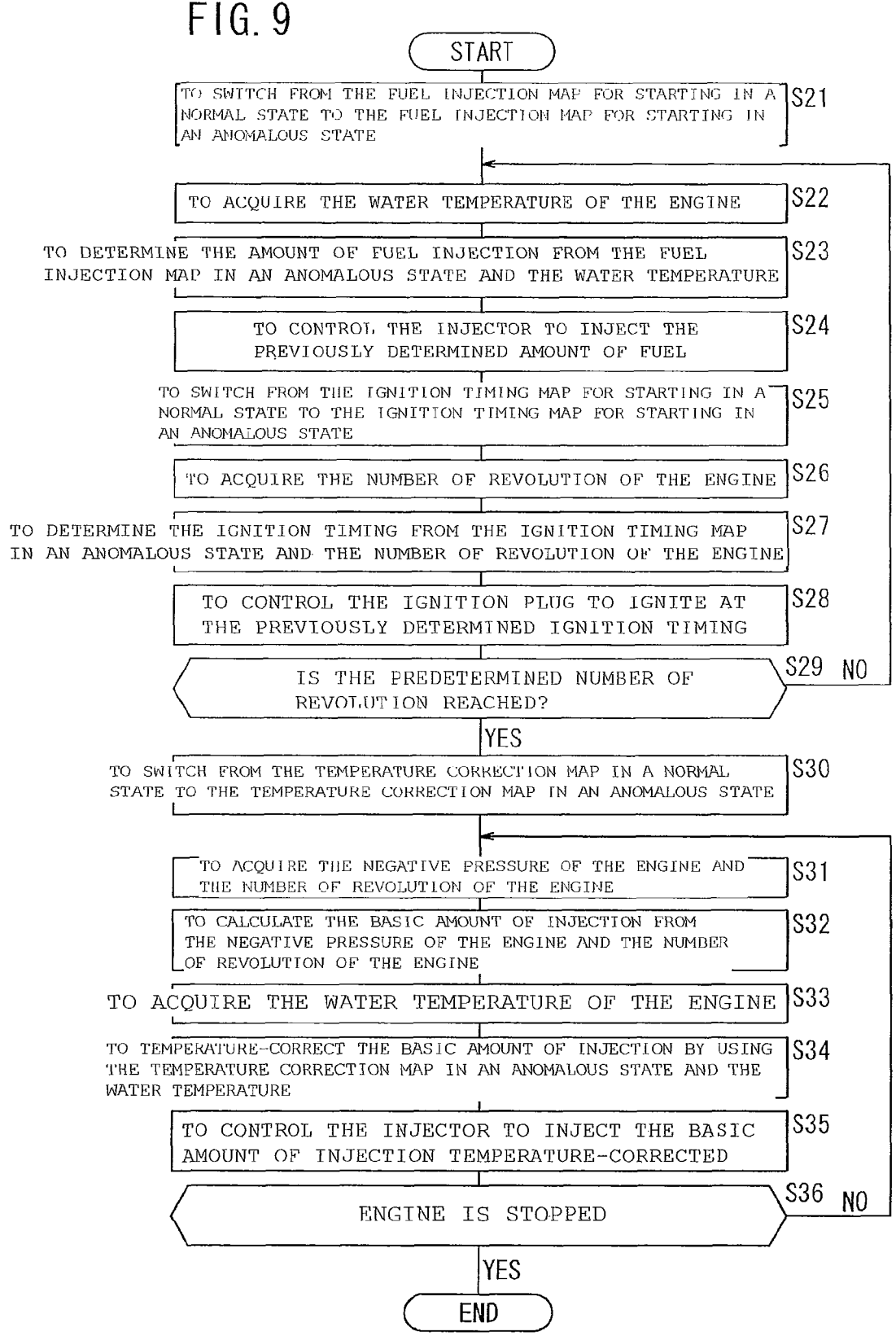
FIG. 9 is a flowchart showing the action of controlling the engine in the case where the engine is restarted after the engine is stopped, with the throttle sensors being judged to be anomalous.

FIG. 9 is a flowchart showing the action of controlling the engine 22 in the case where the engine 22 is restarted after the engine 22 is stalled, with the throttle sensors being judged to be anomalous.

As the starter/reverse switch 76 is pressed, with the shifter gear 108 being at the neutral position, the revolution of the starter motor 92 is transmitted to the crankshaft of the engine 22 (so that the engine 22 starts). At this time, the fuel injecting control section 210 switches the fuel injection map for starting from the one in a normal state to the one in an anomalous state (Step S21).

Then, the fuel injection control section 210 acquires the water temperature of the engine 22 detected by a water temperature sensor 220 (Step S22). Then, it determines the amount of fuel injection in response to the water temperature of the engine 22 acquired as mentioned above and the fuel injection map in an anomalous state (Step S23).

Figure 10:
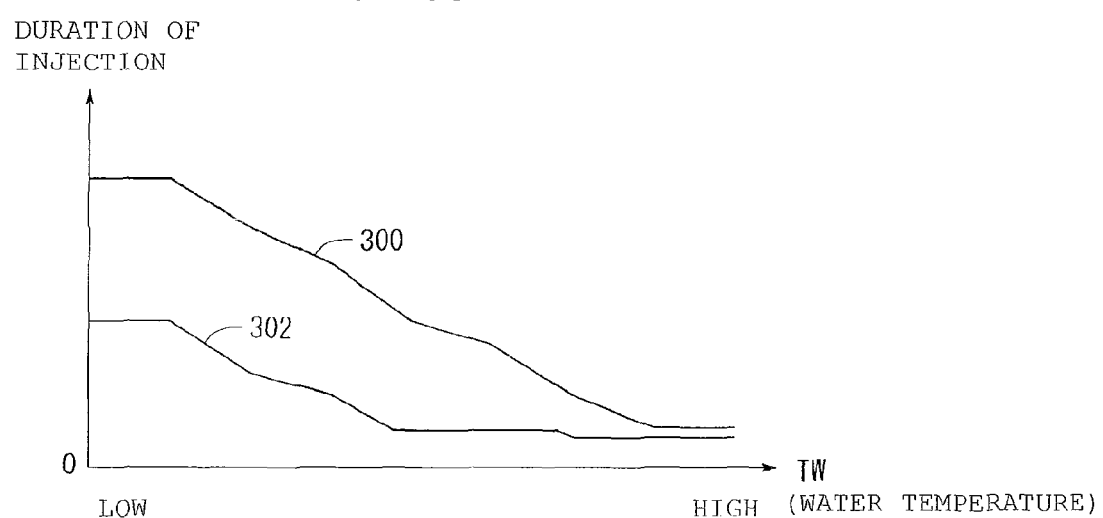
FIG. 10 is a diagram showing the fuel injection map at the time of starting the engine.

FIG. 10 is a diagram showing the fuel injection map for starting. A line 300 represents the fuel injection map for starting in a normal state. A line 302 represents the fuel injection map for starting in an anomalous state. The abscissa represents the water temperature of the engine 22, and the ordinate represents the duration of injection. The injector 158 injects fuel at a predetermined pressure; therefore, the amount of injection increases in proportion to the duration of injection. In other words, the duration of injection indirectly represents the amount of injection.

It is noted from FIG. 10 that the fuel injection map for starting in an anomalous state is set such that the amount of injection is less than that in the fuel injection map for starting in a normal state. When the first and second throttle valve opening sensors 168 and 170 are judged to be anomalous, the throttle valve 162 is returned to the closed state. Consequently, the amount of air entering the engine 22 through the intake pipe 160 in this case is much smaller than in the case where they are judged to be normal. If the same amount of fuel as in the normal state is injected, there is a high possibility of engine stall due to overrich air/fuel ratio. Thus, it is possible to adjust an adequate air/fuel ratio by decreasing the amount of injection in an anomalous state as compared with that in a normal state.

Usually it is impossible to calculate the amount of injection at the time of starting the engine when the negative pressure of the engine 22 and the like cannot be detected. However, it is possible to determine an adequate amount of injection only from the water temperature of the engine 22 if the fuel injection map for starting is employed.

The fuel injection map is designed such that the amount of injection increases as the water temperature of the engine 22 becomes low. When the water temperature of the engine 22 is low, the temperature of the engine oil is also low, and the engine oil is viscous at a low temperature. Therefore, the engine oil produces a large resistance when the water temperature of the engine 22 is low. This makes the crankshaft (not shown) of the engine 22 difficult to rotate. Thus, the amount of injection is increased as the water temperature of the engine 22 becomes low, so that the crankshaft produces a large torque.

Thus, when there is an anomaly in the throttle sensors, the fuel injection map in a normal state is switched into the one in an anomalous state. In this way, it is possible to start the engine 22 easily at all times.

As soon as the amount of injection is determined in Step S23, the fuel injection control section 210 controls the injector 158 so that the injector 158 injects fuel in the thus determined amount (Step S24).

Next, the ignition timing control section 212 switches the ignition timing map for starting from the one in a normal state into the one in an anomalous state (Step S25).

Next, the ignition timing control section 212 acquires the number of revolutions of the engine 22 detected by a revolution sensor 222 (Step S26) and then determines the ignition timing from the thus acquired number of revolutions of the engine 22 and the ignition timing map in an anomalous state (Step S27).

Figure 11:
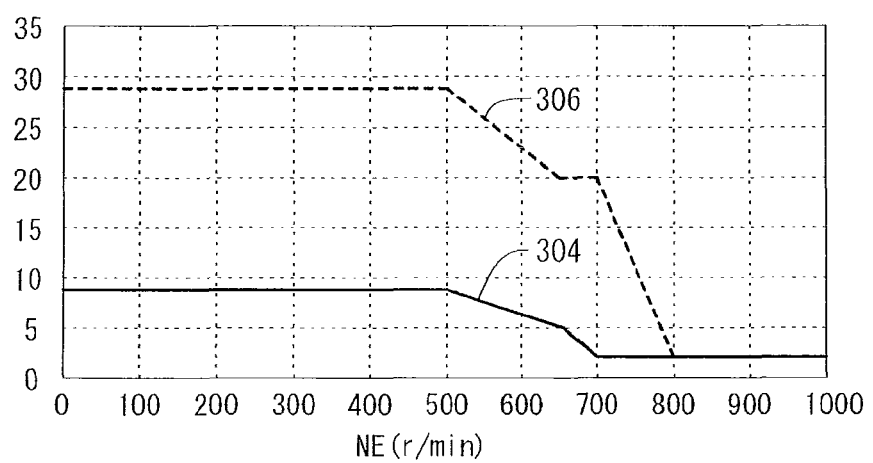
FIG. 11 is a diagram showing the ignition timing map at the time of starting the engine.

FIG. 11 is a diagram showing the ignition timing map for starting. A line 304 represents the ignition timing map in a normal state, and a line 306 represents the ignition timing map in an anomalous state. The abscissa represents the number of revolutions of the engine and the ordinate represents the ignition timing, in terms of the angle of the crankshaft of the engine 22. The ignition timing at zero degrees denotes the ignition timing at the top dead center (without advance or lag). The ignition timing advances in proportion to the angle.

It is noted from FIG. 11 that the ignition timing advances more in the ignition timing map in an anomalous state than in the ignition timing map in a normal state. The advanced ignition timing helps the engine 22 to produce a larger power because a short time is required for the flame to propagate after ignition and for air to flow in after valve opening.

As mentioned above, the throttle valve 162 is returned to its closed position in an anomalous state and hence only very little air flows into the engine 22 through the intake pipe 160 and the amount of fuel injected is also small accordingly. As a result, the output of the engine 22 is so small that the engine 22 would stop. So, it is necessary to advance the ignition timing in an anomalous state more than the ignition timing in a normal state, so that the engine 22 produces a larger output and increases rapidly the number of revolutions. In this way, it is possible to prevent the engine 22 from stopping or it is possible to start the engine 22 easily.

The angle of advance should be larger when the engine 22 is running slow than when the engine 22 is running fast. The reason for this is that engine stall tends to occur when the engine 22 is running slow. In addition, the number of revolutions of the engine 22 is acquired in Step S26; however, this step may be omitted. In this case, Step S27 determines the ignition timing for starting the engine from the predetermined number of revolution and the ignition timing map for starting.

After determining the ignition timing in Step S27, the ignition timing control section 212 controls the ignition plug so that ignition takes place at the previously determined ignition timing. (Step S28)

Next, the control unit 156 judges whether or not the number of revolutions of the engine 22 has reached a predetermined number of revolutions (Step S29). The predetermined number of revolutions may be altered according to the rider's discretion. In this embodiment, it is assumed that the number of revolutions is 500 rpm. Needless to say, the control unit 156 makes a judgment based on the number of revolutions acquired from the revolution sensor 222. If it judges in Step S29 that the predetermined number of revolutions is not yet reached, it returns to Step S22 and repeats the foregoing actions. The engine starting time lasts until it judges in Step S29 that the predetermined number of revolutions is reached.

On the other hand, if it judges in Step S29 that the number of revolutions of the engine 22 reaches the predetermined number, it judges that the engine 22 is started, and the fuel injection control section 210 switches the temperature correction map which is used to correct the basic amount of injection according to temperature after the engine 22 is started, from the one in a normal state into the one in an anomalous state (Step S30).

Then, the fuel injection control section 210 acquires a negative pressure of the engine 22 detected by a negative pressure sensor 224 and also acquires the number of revolutions of the engine 22 detected by the revolution sensor 222 (Step 31). Then, it calculates the basic amount of injection from the negative pressure of the engine 22 and the number of revolutions obtained as mentioned above. (Step S32)

Next, the fuel injection control section 210 acquires the water temperature of the engine 22 detected by the water temperature sensor 220 (Step S33). Then, it corrects the basic amount of injection calculated in Step S32 according to the water temperature of the engine 22 by using the temperature correction map in an anomalous state (Step S34).

Figure 12:
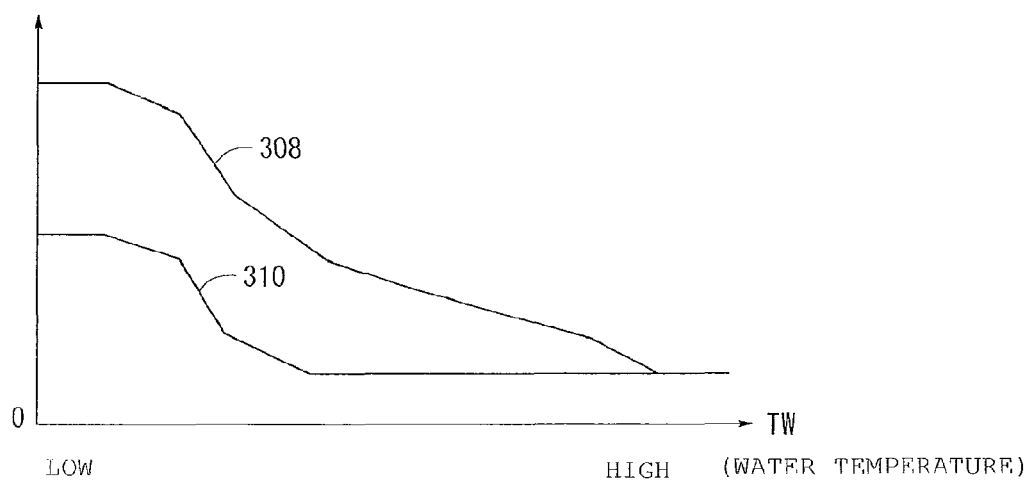
FIG. 12 is a diagram showing the temperature correction map.

FIG. 12 is a diagram showing the temperature correction map. A line 308 represents the temperature correction map in a normal state, and a line 310 represents the temperature correction map in an anomalous state. The abscissa represents the water temperature and the ordinate represents the increased correction factor. Multiplying the basic amount of injection by the increased correction factor gives the correction of the basic amount of injection according to the temperature. The increased correction factor which is indicated by the temperature correction map in a normal state and the temperature correction map in an anomalous state, should be larger than one.

It is noted from FIG. 12 that the increased correction factor indicated by the temperature correction map in an anomalous state sets up a smaller amount of correction than the increased correction factor indicated by the temperature correction map in a normal state. The reason for this is that, as described above, when the first and second throttle valve sensors 168, 169 are judged to be anomalous, the throttle valve 162 is returned to its closed state and hence an adequate air-fuel ratio is maintained by keeping the amount of fuel injection low. Moreover, the increased correction factor is established high because the engine oil increases in resistance more as the water temperature of the engine 22 decreases.

When the temperature correction for the basic amount of injection is made in Step S34, the fuel injection control section 210 controls the injector 158 such that the injector 158 injects fuel according to the basic amount of injection which is temperature-corrected (Step S35).

Next, the control unit 156 judges whether or not the engine 22 is stopped (Step S36). If the control unit 156 judges that the engine 22 is not stopped, the process returns to Step S31.

In addition, the ignition timing after the engine 22 is started may be controlled by the action of Steps S27 and S28. In other words, the ignition timing for the ignition plug 164 may be controlled by using the ignition timing map for starting or by any other methods.

What has been mentioned above is about how to control the injector 158 and the ignition plug 164 to start the engine 22 after the engine 22 is stopped because the throttle sensors are judged to be anomalous. In the case where it is necessary to start the engine 22 after the engine 22 is stopped because the accelerator sensors and throttle sensors are judged to be normal, or the accelerator sensors are judged to be anomalous but the throttle sensors are judged to be normal, it is acceptable to control the amount of fuel injection and the ignition timing by using the fuel injection map for starting in a normal state, the ignition timing map for staring in a normal state, and the temperature correction map in a normal state. In other words, at the time of starting the engine 22, it is a usual practice to control the injection of fuel in a predetermined amount by employing the fuel injection map for starting in a normal state without switching the fuel injection map for starting to be used when the engine 22 is started. Also, it is a usual practice to determine the ignition timing to control ignition by employing the ignition timing map for starting in a normal state without switching the ignition timing map for starting to be used when the engine 22 is started. Also, after the engine 22 is started, it is a usual practice to perform temperature correction for the basic amount of injection by using the temperature correction map in a normal state without switching the temperature correction map to be used for the temperature correction of the basic amount of injection.

The motorcycle 10 having the reverse function is designed so as to switch the fuel injection map for starting, which is used to control the amount of fuel injection, from the fuel injection map for starting in a normal state into the fuel injection map for starting in an anomalous state in which the amount of injection is more reduced than that in a normal state in the case where the engine 22 is started again after it is stopped because the throttle sensors are judged to be anomalous. The effect of this design is that the amount of fuel injection is reduced even in the case where the throttle valve 162 is closed; this prevents the air-fuel ratio from becoming overrich and permits the engine 22 to start easily. This design also makes it unnecessary to mechanically move the throttle valve 162 in the open direction in the case of anomaly, and this contributes to size reduction around the throttle body. Moreover, this design permits the engine 22 to start easily even in the case where the throttle valve 162 becomes closed owing to anomaly in the throttle sensors, and the rider can move the motorcycle backward by means of the starter motor 92. This is convenient for the rider.

In addition, according to the foregoing embodiment, there are two accelerator opening sensors, such as the first accelerator opening sensor 152 and the second accelerator opening sensor 154. However, one accelerator opening sensor may suffice. Moreover, according to the foregoing embodiment, there are two throttle valve opening sensors, such as the first throttle valve opening sensor 168 and the second throttle valve opening sensor 170. However, one throttle valve opening sensor may suffice.

The present invention has been explained above with reference to its preferred embodiment. However, the technical scope of the present invention is not restricted to the one disclosed in the preferred embodiment. The foregoing embodiment may be variously changed or modified within the scope of the claims of the present invention. In addition, the parenthesized symbols contained in the claims of the present invention are quoted from the accompanying drawings to help understand the present invention easily, and they should not be construed to restrict the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine control unit comprising:
   a drive system capable of driving a motorcycle backward while an engine is running;
   a throttle valve energized toward a closed position by a return spring; and
   a drive-by-wire system for detecting amount of operation of an accelerator by accelerator opening sensors for driving said throttle valve by a throttle motor in response to the amount of operation, thereby controlling an opening of said throttle valve and detecting said opening by throttle opening sensors,
   wherein said engine control unit includes:
      an anomaly judging section for judging whether or not there is anomaly in said throttle valve opening sensors based on the output of said throttle valve opening sensors,
      a throttle motor driving section for controlling the driving of said throttle motor, and
      an ignition timing control section having first and second ignition timing maps for controlling ignition timing at a time of starting the engine;
      a fuel injection control section including:
         first and second fuel injection maps for controlling an amount of fuel injection at the time of starting the engine, and
         first and second temperature correction maps for determining the amount of fuel injection after the engine is started by performing temperature correction in response to a water temperature of said engine,
   said throttle motor driving section stops the driving of said throttle motor if said throttle valve opening sensors are judged to be anomalous by said anomaly judging section, thereby causing said throttle valve to be returned to the closed position by said return spring, and
   wherein said first fuel injection map is used for starting the engine when said throttle valve opening sensors are in a normal state, and said second fuel injection map is used for starting the engine when said throttle valve opening sensors are in an anomalous state, the amount of fuel injection set by the second fuel injection map being smaller than that set by the first fuel injection map, and said fuel injection control section also switches said first fuel injection map for starting the engine in the normal state into said second fuel injection map for starting the engine in the anomalous state, at a time of restarting the engine after the engine stops in a state wherein said throttle valve opening sensors are judged to be anomalous by said anomaly judging section, thereby enabling the engine to start and allowing the motorcycle to be moved backward by said drive system.

2. The engine control unit as defined in claim 1, wherein said fuel injection control section determines the amount of fuel injection from an engine negative pressure and the number of engine revolutions after said engine is started and also determines the amount of fuel injection from a water temperature of said engine at the time of starting said engine, and said second fuel injection map for starting in the anomalous state is established such that the amount of fuel injection decreases as the water temperature of said engine rises.

3. The engine control unit as defined in claim 1, wherein said fuel injection control section determines a basic amount of fuel injection from an engine negative pressure and the number of engine revolutions after said engine is started, and
when restarting the engine is performed in a state that said anomaly judging section judges to be anomalous, said fuel injection control section switches said first temperature correction map in the normal state into said second temperature correction map in the anomalous state, a temperature correction in the second temperature correction map being smaller than that of the first temperature correction map, and
wherein when the anomaly judging section has determined that the throttle valve opening sensors are judged to be anomalous, the electronic control unit is adapted to control the ignition timing before performing the temperature correction.

4. The engine control unit as defined in claim 3, wherein the second temperature correction map in the anomalous state is set such that the amount of correction decreases as a water temperature of said engine rises.

5. The engine control unit as defined in claim 1, wherein said anomaly judging section judges whether or not said accelerator opening sensors are anomalous according to the output from said accelerator opening sensors, and
said throttle motor driving section drives said throttle motor to set the opening of the said throttle valve to an idle opening in the case where only said accelerator opening sensors are judged to be anomalous by said anomaly judging section.

6. The engine control unit as defined in claim 2, wherein said anomaly judging section judges whether or not said accelerator opening sensors are anomalous according to the output from said accelerator opening sensors, and
said throttle motor driving section drives said throttle motor to set the opening of the said throttle valve to an idle opening in the case where only said accelerator opening sensors are judged to be anomalous by said anomaly judging section.

7. The engine control unit as defined in claim 1,
wherein said first ignition timing map is used for starting the engine when said throttle valve opening sensors are normal, and
said second ignition timing map is used for starting the engine when said throttle valve opening sensors are anomalous, and
the ignition timing control section switches said first ignition timing map for starting in the normal state into said second ignition timing map for starting in the anomalous state, thereby advancing the ignition timing, at the time of restarting the engine after the engine stops in a state that the anomaly judging section judges to be anomalous.

8. The engine control unit as defined in claim 2,
wherein said ignition timing control section has said first ignition timing map for starting when said throttle valve opening sensors are normal and said second ignition timing map for starting which is applicable when said throttle valve opening sensors are anomalous, and switches said first ignition timing map for starting in a normal state into said second ignition timing map for starting in the anomalous state, thereby advancing the ignition timing, at the time of restarting the engine after the engine stops in a state that the anomaly judging section judges to be anomalous.

9. An engine control unit comprising:
a throttle valve energized toward a closed position by a return spring; and
a drive-by-wire system for detecting an amount of operation of an accelerator by accelerator opening sensors for driving said throttle valve by a throttle motor in response to the amount of operation of the accelerator, thereby controlling an opening of said throttle valve and detecting said opening by throttle opening sensors,
an anomaly judging section for judging whether or not there is an anomaly in said throttle valve opening sensors based on the output of said throttle valve opening sensors,
an ignition timing control section having first and second ignition timing maps for controlling ignition timing at a time of starting the engine;
a fuel injection control section including:
first and second fuel injection maps for controlling an amount of fuel injection at the time of starting the engine, and
first and second temperature correction maps for determining the amount of fuel injection after the engine is started by performing temperature correction in response to a water temperature of said engine,
a throttle motor driving section for controlling the driving of said throttle motor, and a fuel injection control section for controlling an amount of fuel injection at a time of starting the engine by using first and second injection maps for starting,
said throttle motor driving section stops the driving of said throttle motor if said throttle valve opening sensors are judged to be anomalous by said anomaly judging section, thereby causing said throttle valve to be returned to the closed position by said return spring, and
said first fuel injection map is used for starting the engine when said throttle valve opening sensors are in a normal state, and said second fuel injection map is used for starting the engine in an anomalous state, the amount of fuel injection set by the second fuel map being smaller than that set by the first fuel injection map, and
said fuel injection control section also switches said first fuel injection map for starting the engine in the normal state into said second fuel injection map for starting the engine in the anomalous state, at a time of restarting the engine after the engine stops in a state wherein said throttle valve opening sensors are judged to be anomalous by said anomaly judging section, thereby enabling the engine to start and allowing the motorcycle to be moved backward by said drive system.

10. The engine control unit as defined in claim 9, wherein said fuel injection control section determines the amount of fuel injection from an engine negative pressure and the number of engine revolutions after said engine is started and also determines the amount of fuel injection from a water temperature of said engine at the time of starting said engine, and
said second fuel injection map for starting in the anomalous state is established such that the amount of fuel injection decreases as the water temperature of said engine rises.

11. The engine control unit as defined in claim 9, wherein said fuel injection control section determines a basic amount of fuel injection from an engine negative pressure and the number of engine revolutions after said engine is started, and
when restarting the engine is performed in a state that said anomaly judging section judges to be anomalous, said fuel injection control section switches said first temperature correction map in the normal state into said second temperature correction map in the anomalous state, a temperature correction in the second temperature correction map being smaller than that of the first temperature correction map, and wherein when the anomaly judging section has determined that the throttle valve opening sensors are judged to be anomalous, the electronic control unit is adapted to control the ignition timing before performing the temperature correction.

12. The engine control unit as defined in claim 11, wherein the second temperature correction map in the anomalous state is set such that the amount of correction decreases as a water temperature of said engine rises.

13. The engine control unit as defined in claim 9, wherein said anomaly judging section judges whether or not said accelerator opening sensors are anomalous according to the output from said accelerator opening sensors, and said throttle motor driving section drives said throttle motor to set the opening of the said throttle valve to an idle opening in the case where only said accelerator opening sensors are judged to be anomalous by said anomaly judging section.

14. The engine control unit as defined in claim 9, wherein said first ignition timing map is used for starting the engine when said throttle valve opening sensors are normal, and said second ignition timing map is used for starting the engine when said throttle valve opening sensors are anomalous, and the ignition timing control section switches said first ignition timing map for starting in the normal state into said second ignition timing map for starting in the anomalous state, thereby advancing the ignition timing, at the time of restarting the engine after the engine stops in a state that the anomaly judging section judges to be anomalous.

15. The engine control unit as defined in claim 10, wherein said first ignition timing map is used for starting the engine when said throttle valve opening sensors are normal, and said second ignition timing map is used for starting the engine when said throttle valve opening sensors are anomalous, and the ignition timing control section switches said first ignition timing map for starting in the normal state into said second ignition timing map for starting in the anomalous state, thereby advancing the ignition timing, at the time of restarting the engine after the engine stops in a state that the anomaly judging section judges to be anomalous.

* * * * *